United States Patent [19]
Hauck et al.

[11] Patent Number: 4,982,413
[45] Date of Patent: Jan. 1, 1991

[54] METHOD AND DEVICE FOR EVALUATING SIGNALS OF AN INCREMENTAL PULSE GENERATOR

[75] Inventors: Dieter Hauck, Eberbach; Karl-Heinz May, Viernheim; Hans Müller, Sandhausen; Jürgen Rehberger, Dossenheim, all of Fed. Rep. of Germany

[73] Assignee: Heidelberger Druckmaschinen AG, Heidelberg, Fed. Rep. of Germany

[21] Appl. No.: 348,990

[22] Filed: May 8, 1989

[30] Foreign Application Priority Data

May 6, 1988 [DE] Fed. Rep. of Germany ....... 3815533

[51] Int. Cl.$^5$ .................... H03K 21/40; H03K 21/02
[52] U.S. Cl. ........................ 377/17; 377/43; 377/45; 377/55; 377/28
[58] Field of Search .................. 377/45, 28, 29, 39, 377/43, 55, 17

[56] References Cited

U.S. PATENT DOCUMENTS

| 3,740,532 | 6/1973 | Esch | 377/45 |
| 3,943,338 | 3/1976 | Gagniere | 377/45 |
| 4,475,086 | 10/1984 | Allen | 377/45 |
| 4,715,051 | 12/1987 | Giardina | 377/45 |

FOREIGN PATENT DOCUMENTS

| 2207224 | 8/1973 | Fed. Rep. of Germany . |
| 2352975 | 4/1975 | Fed. Rep. of Germany . |
| 3219894 | 8/1984 | Fed. Rep. of Germany . |
| 3318351 | 5/1986 | Fed. Rep. of Germany . |
| 3636000 | 5/1987 | Fed. Rep. of Germany . |
| 2930793 | 3/1988 | Fed. Rep. of Germany . |

Primary Examiner—John S. Heyman
Attorney, Agent, or Firm—Herbert L. Lerner; Laurence A. Greenberg

[57] ABSTRACT

A method and device for evaluating signals of an incremental pulse generator for generating at least two mutually phase-shifted angular speed signals includes counting the angular speed signals only if a permissible combination of the angular speed signals is present.

7 Claims, 5 Drawing Sheets

METHOD AND DEVICE FOR EVALUATING SIGNALS OF AN INCREMENTAL PULSE GENERATOR

SPECIFICATION

The invention relates to a method and a device for evaluating signals of an incremental pulse generator and more particularly, to such an incremental pulse generator which generates at least two mutually phase-shifted angular speed signals which are counted.

In order to determine the position of a machine part, especially the angular position of a rotating machine part, and to use it for control purposes, it has become known heretofore to generate, with the aid of an incremental pulse generator, two mutually phase-shifted angular speed signals, and to count the individual pulses thereof In this regard, errors can result if spurious pulses are superimposed on the angular speed signals. These pulses can arise, for example, due to stray effects in the connecting lines between the incremental pulse generator and a control device. Furthermore, a reason for the spurious pulses may lie in the incremental pulse generator itself if, for example, opaque particles penetrate into an optical incremental pulse generator.

It is accordingly an object of the invention to provide a method and device for evaluating signals of an incremental pulse generator which continue to evaluate the signals free of any trouble even if the incremental pulse generator is disrupted.

With the foregoing and other objects in view, there is provided, in accordance with one aspect of the invention, a method of evaluating signals of an incremental pulse generator for generating at least two mutually phase-shifted angular speed signals, which comprises counting the angular speed signals only if a permissible combination of the angular speed signals is present.

The freedom from interference or disruption during the evaluation of signals of the incremental pulse generator is thereby considerably enhanced.

In accordance with another mode, the method of the invention includes respectively decrementing and incrementing a counter in accordance with edges of both directions of every one of the angular speed signals.

In accordance with a further mode, the method of the invention includes generating a signal for controlling counting direction by comparing one of the angular speed signals with a second least significant figure of a count In accordance with an added mode, the method of the invention includes generating an enabling signal for permitting a counting of the angular speed signals by a comparison of two angular speed signals and a subsequent comparison with a least significant figure of a count.

In accordance with an additional mode, the method of the invention includes combining a direction signal derived independently from the angular speed signals with signals for controlling the counting direction which are derived from the angular speed signals and, in turn, combining the signal resulting from the foregoing combining step with an enabling signal, which is derived from the angular speed signals, for forming a further enabling signal.

In accordance with yet another mode, the method of the invention includes deriving a speed signal which merges from a first into a second logical state for a given speed of the incremental pulse generator, and combining the speed signal with the signal for controlling the counting direction and the direction signal so that a counting of the angular speed signals is uninterrupted at very slow speeds In accordance with another aspect of the invention, there is provided a device for performing a method of evaluating signals of an incremental pulse generator for generating at least two mutually phase-shifted angular speed signals, comprising a counter having an input, a combinatorial circuit having an output connected to the counter input and having inputs, means for feeding the angular speed signals to first inputs of the combinatorial circuit, the counter having outputs connected to second inputs of the combinatorial circuit This device according to the invention is distinguished, on the one hand, by requiring a relatively small expense for the production thereof and, on the other hand, relieves the computer from having to count the pulses continuously by providing a counter having outputs connected to inputs of the computer In accordance with another feature of the invention, the device includes means for feeding to third inputs of the combinatorial circuit a direction signal and a speed signal which merges from a first into a second logical state for a given speed of the incremental pulse generator.

This permits further checking of the angular speed signals in a relatively simple manner.

To further increase the operational reliability of the device, in accordance with a concomitant feature of the invention, there is provided a device including a changeover switch for controlling test signals, the incremental pulse generator being connected to the combinatorial circuit via the changeover switch.

A simple self-test of the device according to the invention is thereby afforded, the self-test being automatically performable, for example, when the machine is switched on.

Other features which are considered as characteristic for the invention are set forth in the appended claims.

Although the invention is illustrated and described herein as embodied in a method and device for evaluating signals of an incremental pulse generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts in the figures are identified by the same reference characters.

Figure 1:
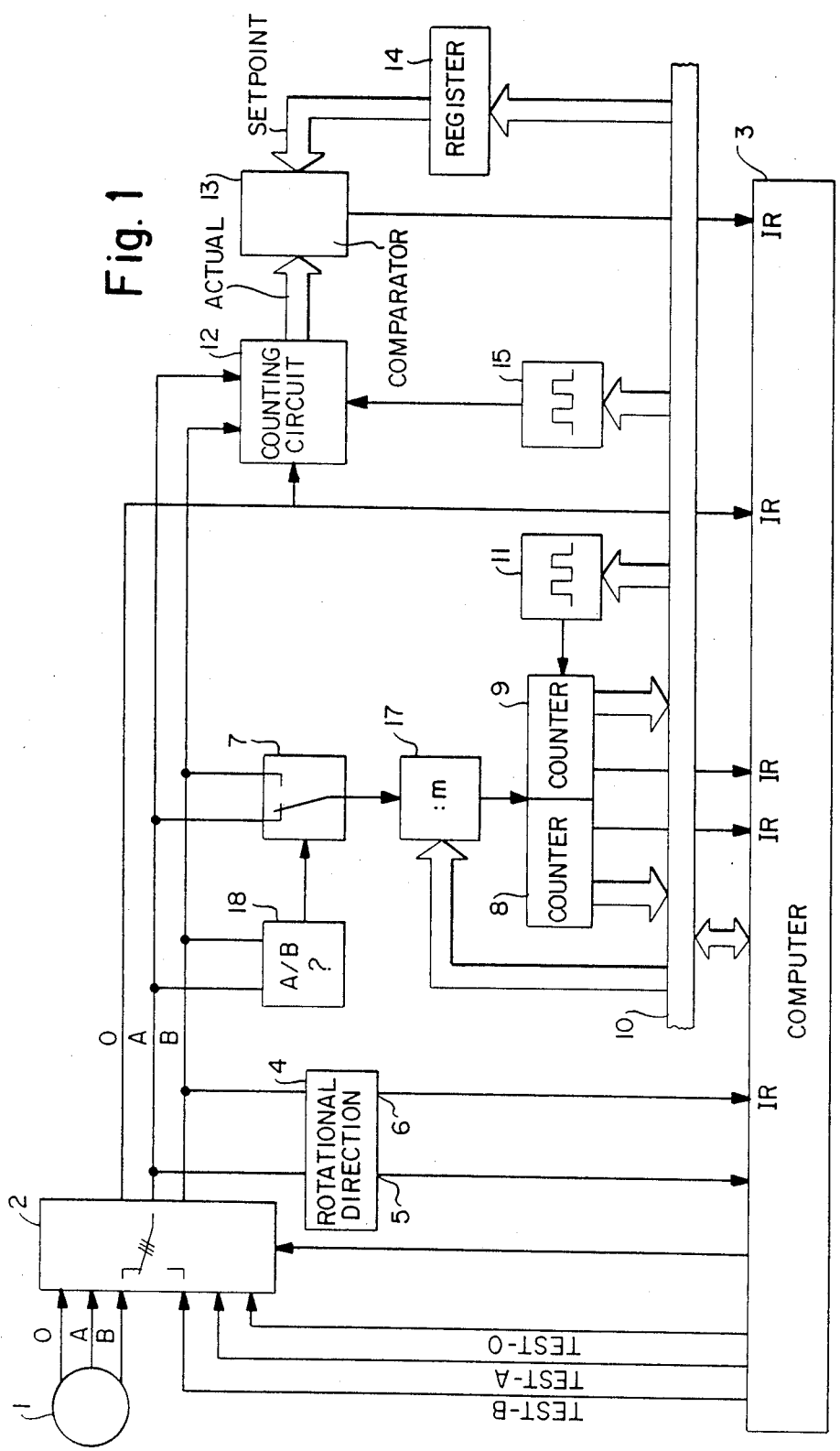
FIG. 1 is a block-diagram of a device for evaluating angular-speed signals in accordance with the invention.

Referring now to the drawings and, first, more specifically to FIG. 1 thereof, there is shown therein an incremental pulse generator 1. Incremental pulse generators of this type may be formed, for example, of a graduated index plate provided with optical markings, which is scanned by optoelectric receivers. In this connection, one of the optoelectric receivers emits a pulse 0 during one revolution. Furthermore, angular-speed signals A and B are generated, which are sinusoidal or wave-shaped and are shifted 90° out of phase with one another. In a conventional incremental pulse generator, the angular-speed signals A and B respectively encompass 1,024 pulses per revolution.

The angular speed-speed signals 0, A and B are fed to inputs of a changeover switch 2, which has further inputs to which electronically generated test signals Test-0, Test-A and Test-B are applied. The changeover switch 2 is controllable by a computer 3 so that, in a test operating mode, the switching operations described hereinafter can be tested also with the machine at a standstill.

The angular-speed signals A and B are evaluated in order to detect the direction of rotation and the position as well as in order to measure the speed and rotational speed, respectively. In order to detect the direction of rotation, the angular-speed signals A and B are fed to a circuit 4. The circuit 4 has two outputs 5 and 6, the output 5 supplying a signal for identifying the direction of rotation, and the output 6 supplying a pulse when there is a change in the direction of rotation. While the direction-of-rotation identification signal is being fed to a data input of the computer 3, the pulse at the output 6 generates a program interrupt (IR).

The rotational speed is measured by two counters 8 and 9, which are supplied via a changeover switch 7 and a frequency divider 17 with one of the angular-speed signals A and B, respectively.

In this connection, the changeover switch 7 is controlled by a circuit 18 in a manner that, if one of the angular-speed signals A and B should fail, the other signal would be passed on. The frequency divider 17 is programmable, for which purpose the respective divider ratio is fed from the computer 3 via a data bus 10 The counters 8 and 9 are supplied by an oscillator 11 with a reference signal having a frequency, in accordance with the extent of resolution of the rotational-speed measurement, which is considerably higher than the frequency of the angular-speed signals. In order also to obtain at high rotational speeds a high degree of resolution of the rotationalspeed measurement without any overflow of the counters 8 and 9 at low rotational speeds, the frequency of the reference signal can be varied. For this purpose, an appropriate value is supplied via the bus system 10 to the oscillator 11 for the reference signal.

The rotational speed is measured so that, in an alternating manner, one of the counters 8, 9 counts the pulses of the reference signal between two pulses generated by the frequency divider 17. After the counting is finished, a program interrupt (IR) is triggered, whereupon the computer 3 reads the count via the data bus 10 In the interim, the other counter 8, 9 has already been started, so that the duration of each period of the output signals from the frequency divider 17 is measured. The measured values are converted in the computer 3 into rotational-speed values.

Because a program interrupt is triggered each time to enable the computer 3 to read the count, other program sequences in the computer become disrupted thereby. In order to prevent these disruptions from occurring too frequently, the frequency of the angular-speed signals A and B, at higher rotational speeds, is divided, as described hereinbefore. Details in this regard are described hereinafter. The data bus 10 and the computer 3 are represented in greatly simplified form, because suitable circuits and components therefor are sufficiently known.

In order to detect the position, the angular-speed signals A and B and the pulse 0 are fed to a counter circuit 12. In addition provision is made for the pulse 0 to trigger a program interrupt. The counter circuit 12 is reset by the pulse 0, so that the count gives the position and rotational angle, respectively, with reference to a starting position. In the device according to FIG. 1, this value is fed as an actual position to a comparator 13, where it is compared with a nominal or setpoint position which has been previously written to a register 14 by the computer 3. When the machine has reached the setpoint position, both the actual and nominal values are identical and the comparator 13 triggers a program interrupt, whereupon the computer 3 initiates measures or actions which have been planned for the setpoint position. Directly thereafter, a new setpoint position can be introduced via the register 14. Until the machine reaches this new set-point position, it is unnecessary for the position of the machine to be continuously measured in the computer 3.

In order to increase the extent or degree of resolution in the measurement of the position, the counter circuit 12 may be supplied with additional pulses from an additional-pulse generator or oscillator 15, the frequency of the additional pulses corresponding to a multiple of the frequency of the angular-speed signals. For this purpose, the oscillator 15 is controlled by the computer 3 based upon the frequency measurement with the aid of the circuits 7 to 11. The counting of the additional pulses yields the less significant figures of the actual position which is fed to the comparator 13. Due to the inertia of the machine, the frequency of the angular-speed signals does not change all too rapidly, so that the frequency measurement and, accordingly, the control of the oscillator 15 occur with sufficient accuracy for the subsequent periods of the angular-speed signal.

Figure 2:
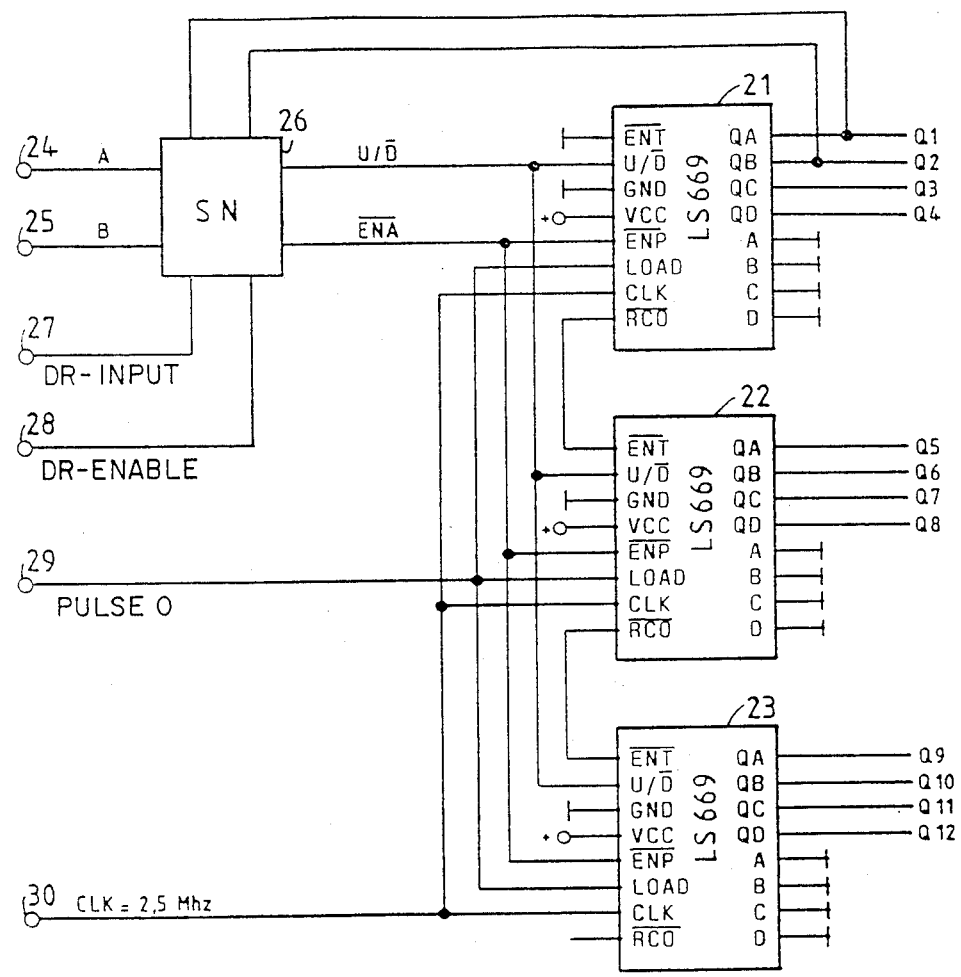
FIG. 2 is the circuit of a counter forming part of the device according to FIG. 1.

FIG. 2 illustrates diagrammatically an embodiment of the counter circuit 12 (FIG. 1) in which three 4-bit counters 21, 22 and 23 of the type LS 669 are provided. Carry outputs of the counters 21 and 22 are connected to inputs of the counters 22 and 23, so that the overall result is a 12-bit counter. The angular speed signals A and B are fed via inputs 24 and 25, respectively, to a combinatorial circuit 26 from which, through logical combination with the two less significant figures Q1 and Q2 of the count, and up/down signal U/D and a counter-enabling signal $\overline{ENA}$ are derived. In addition, the combinatorial circuit 26 is supplied via inputs 27 and 28 with the signals DR-input and DR-enable. The signal DR-input represents the direction of rotation of the machine The signal DR-enable signifies whether the rotational speed of the machine is above or below a rotational speed at which a change in direction can take place. A further input 29 is provided for the pulse 0, which controls the LOAD input and thus resets the counters, because the data inputs A to D are at frame or ground potential. Finally, the counter circuit 12 has an input 30 for a clock signal CLK.

Figure 3:
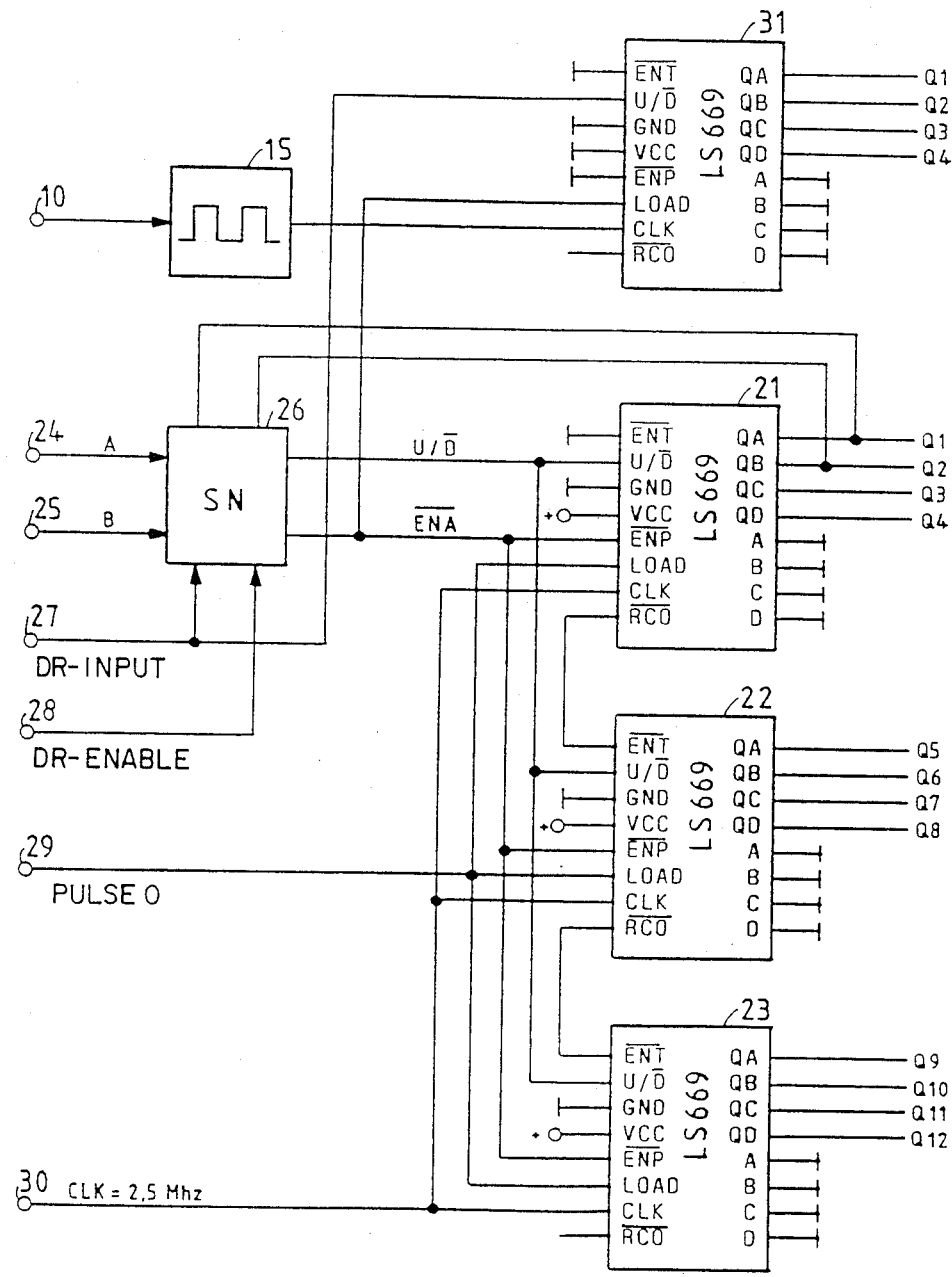
FIG. 3 is another circuit of a counter.

As previously explained hereinbefore in conjunction with FIG. 1, the extent or degree of resolution in measuring the position may be increased with the aid of an oscillator 15 by which further pulses are generated having a frequency which is a multiple of the frequency of the clock signals. In the embodiment of a counter circuit shown in FIG. 3, the oscillator 15 generates pulses having a frequency 64 times that of the angular-speed signals, these generated pulses being fed to a further counter 31 of the type LS 669. The counting direction of the further counter 31 is controlled by the signal DR-input. Thus, the count is extended to 16 places (Q1' to Q4', Q1 to Q 12) and the degree of resolution is increased 16-fold, because a four-fold counting frequency has already been obtained by the evaluation of both edges of the angular-speed signals A and B.

With graduations of 1,024 pulses per full circle, the angular resolution is, accordingly, $360/4,096 = 0.0879$ degrees without the further counter 31, and $360/(4,096 \times 16) = 0.0055$ degrees with the further counter 31.

Figure 4:
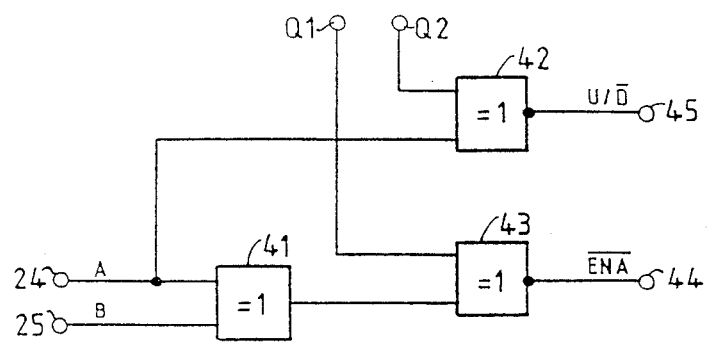
FIG. 4 is a combinatorial circuit which is part of the circuits shown in FIGS. 2 and 3.

FIG. 4 illustrates an embodiment of the combinatorial circuit 26 in which the signals DR-enable and DR-input are not taken into consideration. The combinatorial circuit includes an exclusive-OR element or circuit 41 as well as two equivalence elements or circuits 42 and 43. The angular-speed signals A and B are fed via the respective inputs 24 and 25 to both inputs, respectively, of the exclusive-OR element 41. The output of the exclusive-OR element 41 is connected to one input of the equivalence element 43, another input of which is connected to a least-significant bit (LSB) Q1. The enable signal $\overline{ENA}$ for the counter can be picked off at the output 44 of the equivalence element 43. In order to obtain an up/down signal $U/\overline{D}$, the angular-speed sign A as well as a second least-significant digit or bit Q2 of the count is fed to the equivalence element 42 which has an output 45 from which the signal $U/\overline{D}$ can be picked off.

Figure 5:
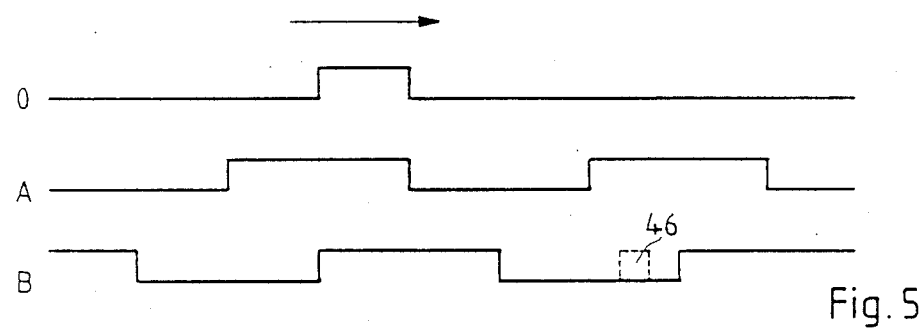
FIG. 5 is a collection of timing diagrams of several signals used in the counter shown in FIG. 2.

The operating principle or function of the combinatorial circuit shown in FIG. 4 in conjunction with the counter shown in FIG. 2 is explained in greater detail hereinafter with reference to FIG. 5. FIG. 5 shows timing or time rate-of-change diagrams for signals 0, A and B for a given direction of rotation, for example, for clockwise rotation. Furthermore, values for Q1 and Q2 of the counter 21 and the entire count Q1 to Q12 are given in FIG. 5. Finally, the count Q1' to Q4' (FIG. 3) is indicated.

The signal 0 occurs once during each revolution, whereas the angular-speed signals A and B occur more frequently, depending upon the divisions of the incremental pulse generator, for example, 1,024 times per revolution. The angular-speed signals A and B are phase-shifted 90° with respect to one another. The counter is reset by the pulse 0, so that the count becomes 0 and, therefore, the two less significant figures or bits Q1 and Q2 also assume the value 0. After the first subsequent edge of the angular-speed signal A, the signals A and B become different, so that the value 1 is present at the output of the exclusive-OR element 41. By the interconnection with Q1=0 in the equivalence element or circuit 43, the output 44 likewise becomes 0, which effects the enabling of the counter. Because Q2=0 and A becomes=0 at this time, $U/\overline{D}$ becomes=1, which effects an incrementation of the counter (counting up).

The incrementation of the counter makes Q1=1, which, in turn, with the following edge of the angular-speed signal B, results in the equality of the angular-speed signals A and B to $\overline{ENA}$=0, so that there is a further incrementation of the counter.

At the beginning of the subsequent quarter-period of the angular-speed signals, the signal A jumps to 1. Because Q2 is likewise=1, however, $U/\overline{D}$ becomes=1. Because A and B, furthermore, are different, but Q1=0, therefore $\overline{ENA}$=0, so that the counter is once again incremented.

Figure 6:
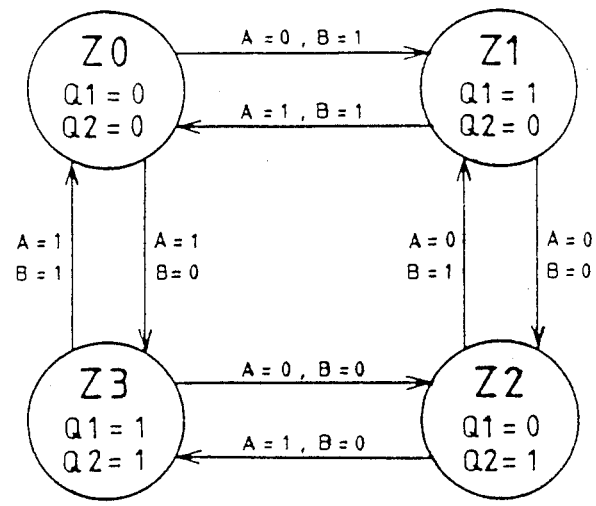
FIG. 6 is an automata graph which explains the function or operating principle of the combinatorial circuit.

In order further to explain the operating principle or function of the combinatorial circuit shown in FIG. 4 in conjunction with the counter circuit, particularly with the counter 21 (FIG. 2), reference is made hereinafter to the automata graph shown in FIG. 6. According thereto, the combinatorial circuit 26, including the less significant bits or figures of the counter 21, can assume the states Z0, Z1, Z2 and Z3. The values present in these states at the outputs Q1 and Q2 are given in the circles representing the states. A transition from one state to another can be effected only by counting up and counting down, respectively, which is indicated in FIG. 6 by arrows between the circles. In this connection, the figures adjacent to the arrows signify the values of the angular-speed signals A and B necessary for the respective transition. Thus, for example, a transition from the state Z0 to the state Z1 is caused by A=0 and B=1. If, afterwards, B becomes=0, there is a transition of the combinatorial circuit to the state Z2.

The filter effect of the combinatorial circuit is explained with reference to an example of a spurious pulse 46 (FIG. 5). Prior to the spurious pulse, the combinatorial circuit is in the state Z3. Due to the fact that, during the spurious pulse 46, the angular-speed signal B assumes the value 1, there is a switch-over to the state Z0, because the angular-speed signal A=1 also. At the end of the spurious pulse, however, B again becomes=0, with the result that the combinatorial circuit is reset to the state Z3. The counter is, therefore, incremented by the spurious pulse 46; after the spurious pulse, however, the counter is again decremented, with the result that there is no falsification of the count.

The effect of the combinatorial circuit shown in FIG. 4 is, therefore, that, in any state, only the respective adjacent states are allowed. The count 0 can, therefore, be followed only by one of the counts 1 or 4,095. A further increase in operational reliability is achieved by the inputting of the direction of rotation via the computer 3 (FIG. 1). In this connection, a change in the direction of rotation indicated by the angular-speed signals A and B is recognized as an error by this is in contradiction with the DR-input signal that has been supplied by the computer. When the machine is stationary or revolving at low rotational speeds, however, this additional check may lead to errors and is, therefore, switched off if, because of low rotational speeds, a change of direction of rotation is possible. The computer, therefore, supplies a further DR-enable signal which, above a given rotational speed, assumes the value 1.

Figure 7:
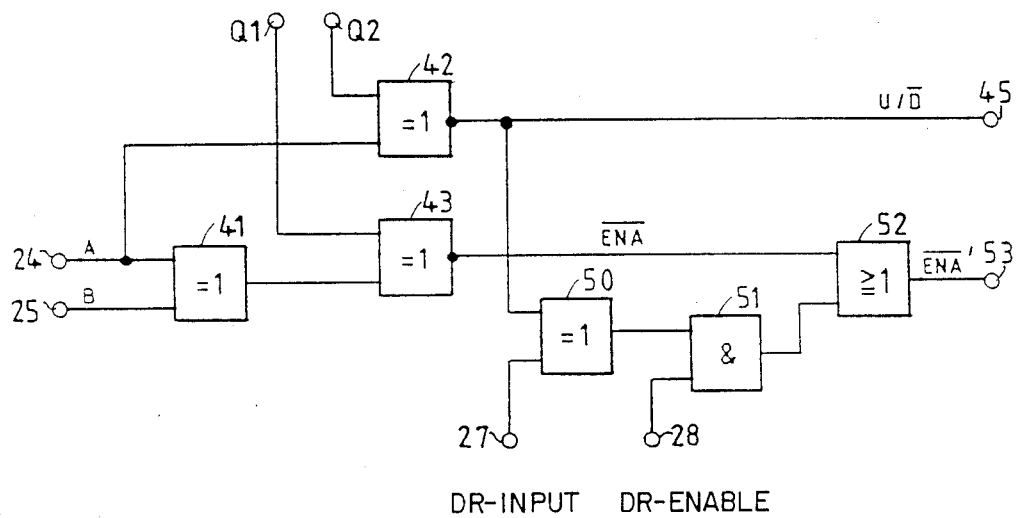
FIG. 7 is a block diagram of another combinatorial circuit.

The combinatorial circuit shown in FIG. 7 contains, in addition to the components previously described in conjunction with FIG. 4, an exclusive-OR element 50, an AND element 51 and an OR element 52. The output signal $\overline{ENA}$ of the equivalence element 43 which, with the combinatorial circuit according to FIG. 4, disables ($\overline{ENA}$=1) or enables ($\overline{ENA}$=0) the counter, is delivered to one input of and once again filtered by an OR element 52 in the combinatorial circuit shown in FIG. 7. The output signal $\overline{ENA}'$ of this OR element 52 is fed via the output 53 to the counter. If the value 0 is present at the other input of the OR element 52, $\overline{ENA}$ becomes = $\overline{ENA}$, with the result that the combinatorial circuit shown in FIG. 6 operates like the combinatorial circuit shown in FIG. 4. If, however, there is a 1 at the other input of the OR element 52, the output 53 is set to 1 irrespective of the value of $\overline{ENA}$, which effects a disabling of the counter. This disabling of the counter can, however, take place only of both inputs of the AND element 51 are supplied with the value 1. This is the case if both the signal DR-enable has the value 1 and also the two signals identifying the direction of rotation U/D and DR-input which were obtained independently of one another are different from one another.

We claim:

1. Method of evaluating signals, possibly containing a spurious pulse, of an incremental pulse generator for generating a combination of at least two mutually phase-shifted angular speed signals, which comprises counting the angular speed signals only if no spurious pulse is present in said combination of the angular speed signals, combining a direction signal derived independently from the angular speed signals with signals for controlling the counting direction which are derived from the angular speed signals and, in turn, combining the signal resulting from the foregoing combining step with an enabling signal, which is derived from the angular speed signals, for forming a further enabling signal, deriving a speed signal which merges from a first into a second logical state for a given speed of the incremental pulse generator, and combining the speed signal with the signal for controlling the counting direction and the direction signal so that a counting of the angular speed signals is uninterrupted at very slow speeds.

2. Method according to claim 1, which includes respectively decrementing and incrementing a counter in accordance with edges of both directions of every one of the angular speed signals.

3. Method according to claim 2, which includes generating a signal for controlling counting direction by comparing one of the angular speed signals with a second least significant figure of a count.

4. Method according to claim 2, which includes generating an enabling signal for permitting a counting of the angular speed signals by a comparison of two angular speed signals and a subsequent comparison with a least significant figure of a count.

5. Device for performing a method of evaluating signals of an incremental pulse generator for generating at least two mutually phase-shifted angular speed signals, comprising a clock pulse counter in said counting circuit having an input, a combinatorial circuit in said counting circuit having an output connected to said counter input and having first and second inputs, means for feeding the angular speed signals to said first input of said combinatorial circuit, said counter having outputs connected to said second input of said combinatorial circuit.

6. Device according to claim 5 including means for feeding to third inputs of said combinatorial circuit a direction signal and a speed signal which merges from a first into a second logical state for a given speed of the incremental pulse generator.

7. Device according to claim 5, including a changeover switch for controlling test signals, the incremental pulse generator being connected to said combinatorial circuit via said changeover switch.

* * * * *